United States Patent
Hsieh

(10) Patent No.: US 7,253,806 B2
(45) Date of Patent: Aug. 7, 2007

(54) COMPUTER KEYBOARD

(75) Inventor: You-Jun Hsieh, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 537 days.

(21) Appl. No.: 10/670,269

(22) Filed: Sep. 26, 2003

(65) Prior Publication Data

US 2005/0068302 A1   Mar. 31, 2005

(51) Int. Cl.
*G09G 5/00* (2006.01)
(52) U.S. Cl. .......................................... 345/168; 341/22
(58) Field of Classification Search ................ 345/168, 345/169, 170, 171, 172; 341/22
See application file for complete search history.

(56) References Cited

U.S. PATENT DOCUMENTS

| | | | | |
|---|---|---|---|---|
| 5,717,428 A | * | 2/1998 | Barrus et al. ................ | 345/168 |
| 6,525,743 B1 | * | 2/2003 | Patrick et al. ............... | 345/619 |
| 6,686,908 B1 | * | 2/2004 | Kobayashi ................... | 345/173 |
| 2002/0109675 A1 | * | 8/2002 | Kuan .......................... | 345/168 |

FOREIGN PATENT DOCUMENTS

TW    089122574    10/2000

* cited by examiner

*Primary Examiner*—Richard Hjerpe
*Assistant Examiner*—Jean Lesperance
(74) *Attorney, Agent, or Firm*—Birch, Stewart, Kolasch & Birch, LLP

(57) ABSTRACT

A computer keyboard with a monitor on the operating panel thereof. Data entered by users from the keyboard is synchronously displayed on the keyboard monitor, eliminating the need for a user to look back and forth at the positions of keys and the data displayed on the monitor during a data entry process. The keyboard can also be an independent input device used to enter data even when the keyboard is disconnected from the computer. Such a keyboard has a memory unit that can temporarily store the entered data while the keyboard is disconnected, and then load the data into the computer when the keyboard recovers its connection with the computer. Thus, the keyboard is capable of receiving and storing data when the keyboard is disconnected, and transmitted stored data upon reconnection with the computer.

6 Claims, 4 Drawing Sheets

COMPUTER KEYBOARD

FIELD OF THE INVENTION

The present invention relates to a computer keyboard, and more particularly pertains to a keyboard for entering data and displaying the data on the keyboard synchronously, in which data can be entered independently even when the keyboard is disconnected.

BACKGROUND OF THE INVENTION

Divided by basic functions, a general computer usually includes an input unit, an output unit, and a processing unit. At present, the most important input units of a computer are nothing more than a keyboard and a mouse, and the monitor is the most important output unit.

The structure of a keyboard comprises a plurality of keys, and each key represents one or more specific character (including a symbol, a text, or a number). Many keys adopt the bitmapped structure; after a user presses a key, the keyboard microcontroller (MCU) will generate a character code corresponding to this key, and then send the character code to the computer system. The signal of such character code will be decoded by the central processing unit (CPU) and the software in the computer system, and then saved in the memory unit (such as a hard disk) or sent to the monitor microcontroller for the processing or conversion, and finally displayed on the monitor.

For those familiar with the keyboard operation, it is not necessary to focus on the keyboard position to enter data, but our vision can stay on the display content of the monitor. On the other hand, for those unfamiliar with the keyboard position, it is necessary to look back and forth at the keyboard position and the data displayed on the monitor frequently to assure the accuracy and consistency of the data during the process of entering data. This method requires the user to look back and forth between the key position of the keyboard and the data displayed on the monitor, which not only causes inconvenience to the operation, but also causes tiredness or even injury easily.

In the R.O.C. patent application No. 89122574 entitled "Keyboard with display device", a keyboard having a display device on the external casing of the keyboard was disclosed, and its basic technical measure is to add a display device to a traditional keyboard. With the control of a control circuit in the keyboard, after any key is pressed, the symbol representing such key will be displayed on the display device on the external casing of the keyboard and the peripheral device (computer system or notebook computer) connected to the keyboard. The foregoing patented technology has made a slight improvement on the traditional keyboard to solve the inconvenience on the aforesaid application.

However, as to the foregoing patented technology or the traditional keyboard design, all keyboards regardless of being connected to a computer system a by cable or by wireless transmission technology (such as the wireless transmission or infrared transmission have to be in connection with the computer before it can enter data. Once the keyboard is disconnected with the computer system, it is unable to enter or save data into the computer system even if the data is entered from the keyboard. Thus, the traditional keyboard does not have the working capability when it is disconnected.

SUMMARY OF THE INVENTION

The primary objective of the present invention is to provide a computer keyboard that can be operated when disconnected.

The technical solution of this invention is to add a monitor on the panel of the keyboard and a monitor microcontroller (MCU) for controlling the monitor. The foregoing keyboard has a memory unit, and such memory unit can store the bitmapped graphic patterns of the common characters. When the keyboard is disconnected, the character entered by the keyboard is coded into the corresponding character code first by the keyboard microcontroller and saved into the memory unit. Then, the bitmapped graphic patterns of the corresponding character codes are read from the memory unit, and displayed on the monitor on the keyboard panel. Therefore, the keyboard in accordance to this invention can enter the data when the keyboard is disconnected, and temporarily save the inputted data into the memory unit. As soon as the keyboard recovers its connection with the computer, the temporarily stored data will be loaded into computer, and thus this invention provides a working capability when the keyboard is disconnected.

Another preferred embodiment of this invention makes use of the online update mechanism and the memory update technology to update the bitmapped graphic patterns stored in the memory unit when the keyboard is connected to the computer system.

Another objective of this invention is to provide a computer keyboard that can enter data and display the inputted data on the operating panel of the keyboard regardless of its being connected or disconnected with the computer.

By means of setting a monitor on the panel of the keyboard, the character entered from the keyboard is decoded into the corresponding character code by the keyboard microcontroller. In the meantime, the keyboard microcontroller will detect whether or not the keyboard is connected to the computer system. If the keyboard is connected, the character code is sent to the computer system for the decoding, and the bitmapped graphic pattern corresponding to the character code from the computer system is sent to the monitor microcontroller in the keyboard, and then displayed on the monitor of the keyboard. On the contrary, if the keyboard is disconnected, the character entered by the keyboard is encoded into the corresponding character code by the keyboard microcontroller and saved in the memory unit. Then the bitmapped graphic pattern corresponding to the character code is read from the memory unit, and displayed on the monitor on the keyboard panel. Therefore, users no longer need to look back and forth at the key position and the data displayed on the monitor during the data entry process to enhance the convenience of the operation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
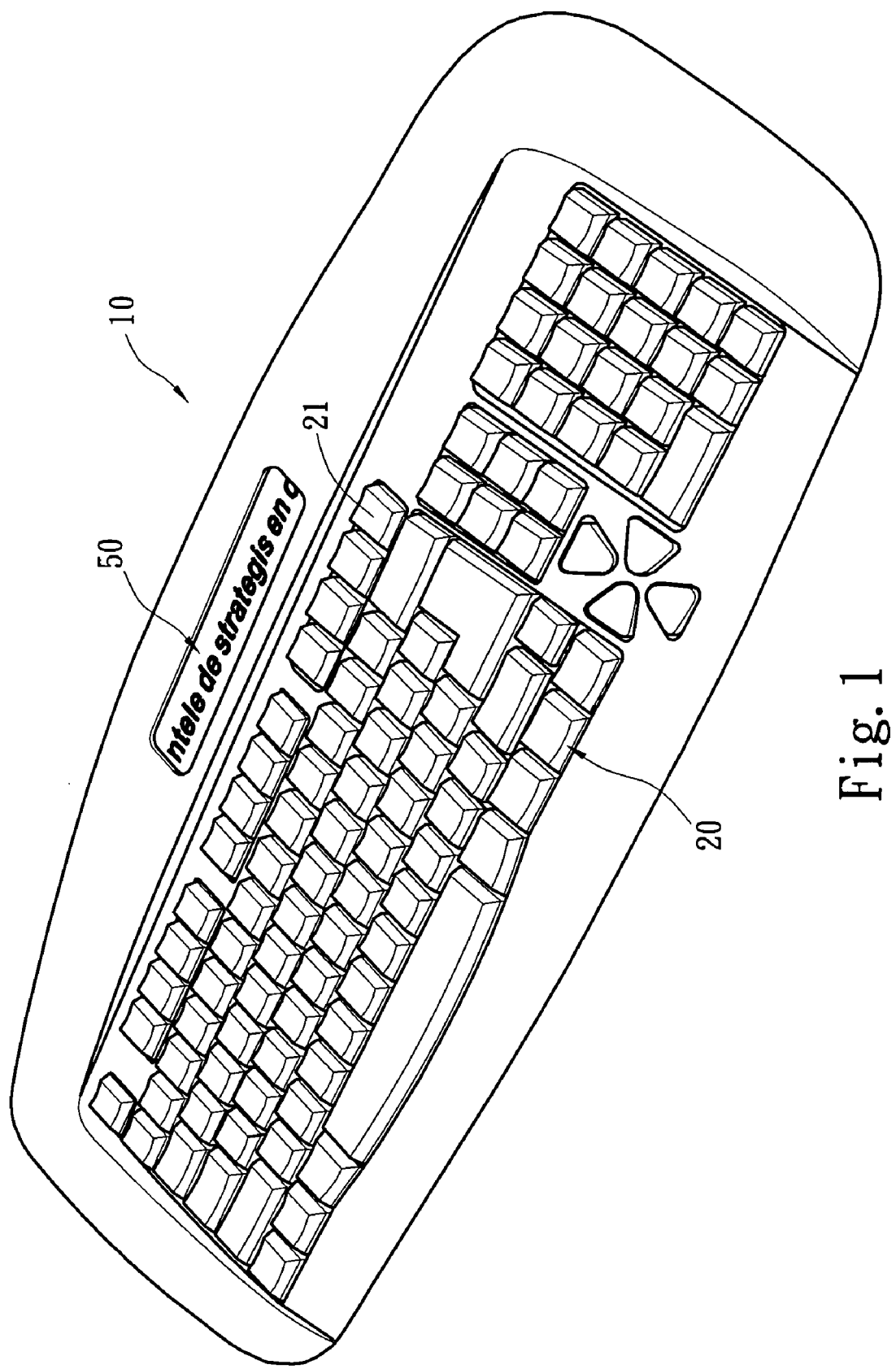
FIG. 1 is a perspective diagram of the structure of this invention.
Figure 2:
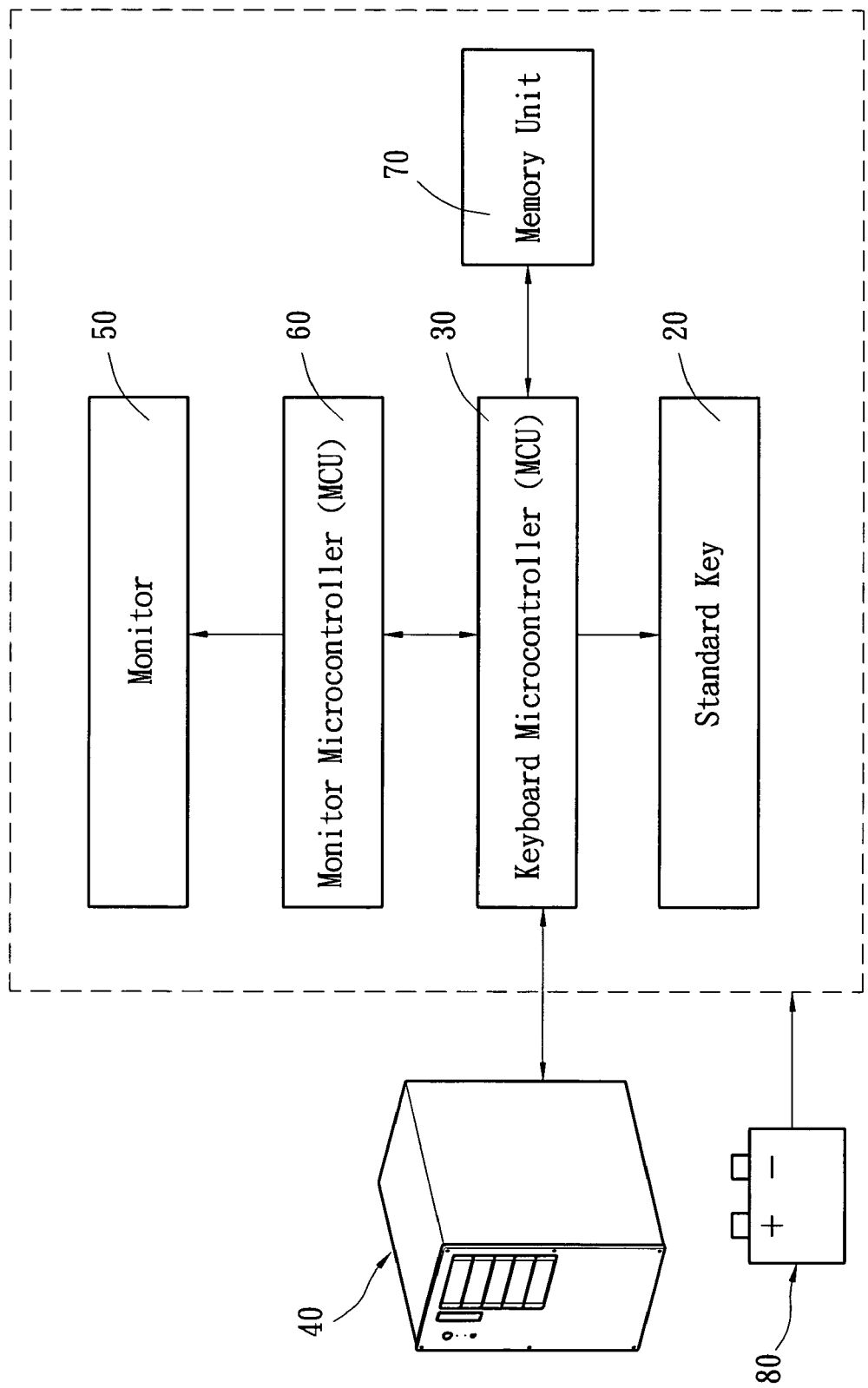
FIG. 2 is a functional block diagram of a preferred embodiment of this invention.

Please refer to FIGS. 1 and 2 for the present invention, which discloses a computer keyboard 10 having a structure by modifying the general standard computer keyboard and being used as one of the input peripherals for a computer system. The computer keyboard of this invention comprises:

a standard key 20 having a plurality of keys 21 for inputting data that includes all English alphabetical keys, numeric keys, special function keys (such as F1~F12), and arrow keys (such as Up, Down, Left, and Right), etc.;

a keyboard microcontroller (MCU), for producing a character code corresponding to a key 21, and outputting the character code to a computer system 40 connected to the keyboard 10;

a monitor 50, being installed on the operational panel of the keyboard 10 for displaying the data entered by the key 21;

a memory unit 70, for storing the character or data entered from the keyboard 10;

a power supply unit 80, for providing the electric power required for the operation of the keyboard 10; and a monitor microcontroller (MCU) 60, for displaying the content of the character or data entered from the keyboard 10 on the monitor 50.

Figure 3:
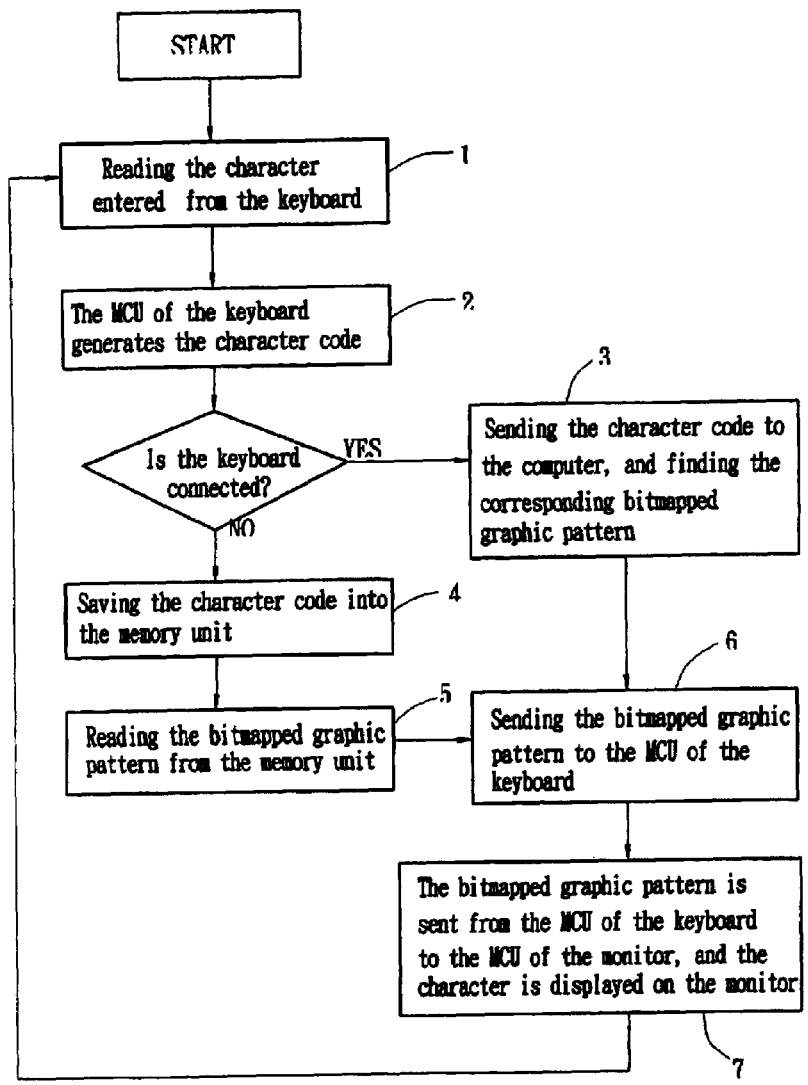
FIG. 3 is a flowchart of the working process according to a preferred embodiment of this invention.

Please refer to FIG. 3 of the first preferred embodiment of the computer keyboard in accordance with this invention. The operating side (generally refers to the side facing the user and where the user can see it) of the keyboard 10 has a monitor 50 and a microcontroller 60 for driving the monitor 50 to work, wherein the monitor 50 is a LCD screen or a LED display which at least can display the bitmapped fonts.

This invention allows a user to enter data when the keyboard 10 is disconnected with the computer 40, and the memory unit 70 of the preferred embodiment is built in the keyboard 10. Further, the detachable memory card (such as a flash memory) can be adopted as the memory unit 70. The power supply unit 80 adopts a general battery as the electric power source for the operation.

When the keyboard is disconnected, the power supply unit 80 supplies the electric power required for the operation of the keyboard 80, and the character entered by the user from the keyboard 19 will be saved into the memory unit 70. As soon as the keyboard 10 resumes its connection with the computer system 40, the character data stored in the memory unit 70 will be loaded into the computer system 40. Such arrangement will provide a computer keyboard 10 to enter data when the keyboard 10 is disconnected from the computer system 40. The procedure of the working flow as shown in FIG. 3 comprises the steps of:

1. Reading the character data (such as an alphabet, a symbol, or a number, etc.) entered by the standard key 20;
2. Generating a character code corresponding to the inputted character data by the keyboard microcontroller 30;
3. The keyboard microcontroller 30 checking the connection status of the keyboard; if the keyboard being connected to the computer system 40, then the character code being sent to the computer system 40, and the computer system 40 decoding the received character code to find out the corresponding bitmapped graphic pattern (or the bitmapped font), and then executing Step 6, or else executing the following step:
4. The keyboard microcontroller 30 saving the corresponding character code into a memory unit 70;
5. The keyboard microcontroller 30 reading the bitmapped graphic pattern (bitmapped font) of the corresponding character code in the memory unit 70;
6. Sending the bitmapped graphic pattern back to the keyboard microcontroller 30;
7. The keyboard microcontroller 30 sending the obtained bitmapped graphic pattern to the monitor microcontroller 60 of the keyboard 10, and displaying the entered data on the monitor 50 of the keyboard; and
8. Repeating the foregoing steps.

The bitmapped graphic pattern obtained in Step 5 is saved in the memory unit 70, and since the capacity of the memory unit 70 is taken into account, therefore the bitmapped graphic patterns of some common basic characters are saved in the memory unit 70 first to facilitate the user to key in the character while displaying the character on the monitor 50 of the keyboard 10 when the keyboard 10 is disconnected. To solve the problem of not able to displaying those bitmapped graphic patterns of characters which are not included in the memory unit 70, the keyboard microcontroller 30 in accordance with this invention will use a preset bitmapped graphic pattern (such as a universal character "*") to substitute such entered character if the keyboard microcontroller 30 cannot find the corresponding bitmapped graphic pattern, and then display such pattern on the monitor 50. The corresponding character code of the entered character will still be saved in the memory unit 70 to assure that the character entered by the user will be loaded correctly into the computer system 40 without missing after the keyboard 10 resumes its connection with the computer system 40.

Since the keyboard 10 disclosed by this invention can only provide a pure character input function when the keyboard 10 is disconnected, therefore all characters entered from the keyboard 10 by users are saved in the memory unit 70 in terms of the basic character codes (similar to the general text format).

Figure 4:
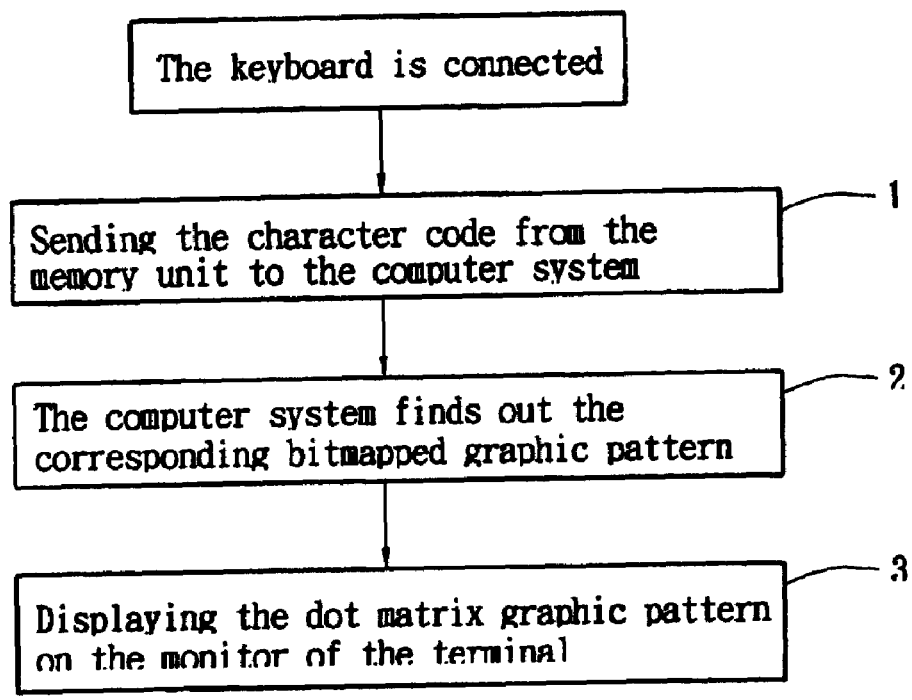
FIG. 4 is a flowchart of the working process according to a preferred embodiment of this invention after the keyboard resumes its connection with the computer system.

When the keyboard 10 resumes its connection with the computer system 40, the working flow procedure of the character code in the memory unit 70 being loaded into the computer 40 as shown in FIG. 4, comprises the steps of:

1. The keyboard controller 30 loading the character code saved in the memory unit 70 to the computer system 40 after the keyboard 10 resuming its connection with the computer system 40;
2. The computer system 40 decoding the received character code and finding out the bitmapped graphic pattern (that is the bitmapped font) corresponding to the of the character code;
3. The computer system 40 displaying the content of the character code on the terminal monitor of the computer system 40.

In another preferred embodiment of this invention, the bitmapped graphic pattern saved in the memory unit 70 can be copied into the memory unit 70 first, or by means of the software mechanism and the technology of updating the memory contents, the bitmapped graphic patterns saved in the memory are updated after the keyboard 10 is connected to the computer system 40. Of course, the bitmapped graphic pattern corresponding to the common character codes entered by the users and saved in the memory unit 70 can be updated by the application program technology to achieve the effect of saving the memory space of the memory unit 70 and overcome the shortcoming of occupying too many memory spaces of the memory unit 70 for those uncommon bitmapped graphic patterns. Such related technology is well known to those skilled in the art and thus will not be described here.

Therefore, users can use the keyboard 10 of this invention to enter data even when the keyboard 10 is disconnected. The keyboard microcontroller 30 will generate the character code corresponding to the entered character, and read the bitmapped graphic pattern corresponding to such character code from the memory unit 70, and then send the bitmapped graphic pattern to the microcontroller 60 of the monitor 50 of the keyboard 10, and display the data entered by the user on the monitor 50 of the keyboard 10 to facilitate users for the operation when the keyboard is disconnected.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A computer keyboard for inputting data, capable of being disconnected from a computer system, comprising:
    a standard press key, having a plurality of keys for entering character data;
    a keyboard microcontroller (MCU) for generating a character code corresponding to the key;
    a monitor, disposed on the operating panel of the keyboard;
    a monitor microcontroller (MCU) for driving the monitor to display a bitmapped graphic pattern of the character entered from the standard press key;
    a memory unit for saving the character code; and
    a power supply unit for supplying the electric power required by the computer system,
    wherein, upon resuming a connection with the computer system, the keyboard microcontroller (MCU) sends the character code stored in the memory unit to the computer system, receives the bitmapped graphic pattern corresponding to the character code returned from the computer system, and then sends the bitmapped graphic pattern to the monitor microcontroller (MCU) for driving the monitor to display the bitmapped graphic pattern on the monitor.

2. The computer keyboard of claim 1, wherein the memory unit saves the bitmapped graphic pattern corresponding to the character code, such that when the standard press key enters a character, the keyboard microcontroller (MCU) being read and the monitor microcontroller (MCU) driving the monitor to display the bitmapped graphic pattern of the character.

3. The computer keyboard of claim 1, wherein the bitmapped graphic pattern in the memory unit is updated when the keyboard resumes a connection with the computer system.

4. The computer keyboard of claim 1, wherein the memory unit is a memory built in the computer keyboard.

5. The computer keyboard of claim 1, wherein the memory unit is a detachable memory card.

6. The computer keyboard of claim 1, wherein the power supply unit is a battery.

* * * * *